Dec. 10, 1935. J. G. DOUGLAS 2,023,670
STEERING GEAR OF MOTOR ROAD VEHICLES
Filed June 20, 1934 3 Sheets-Sheet 3
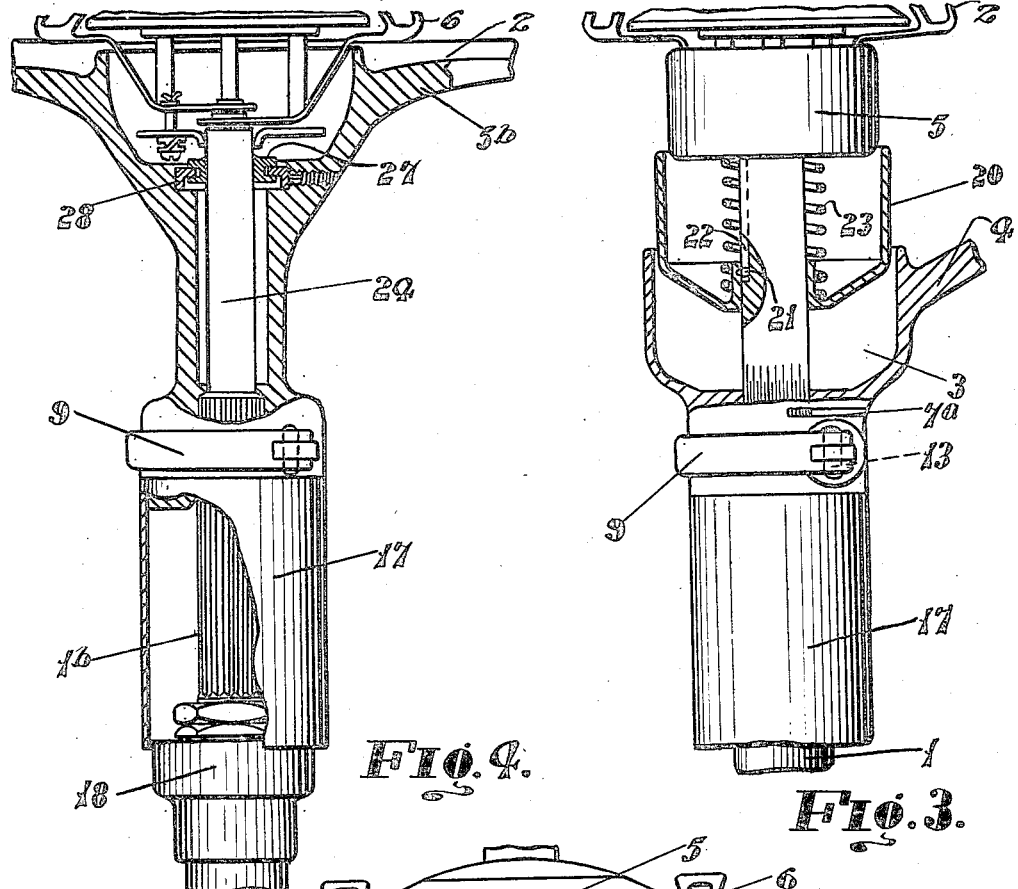
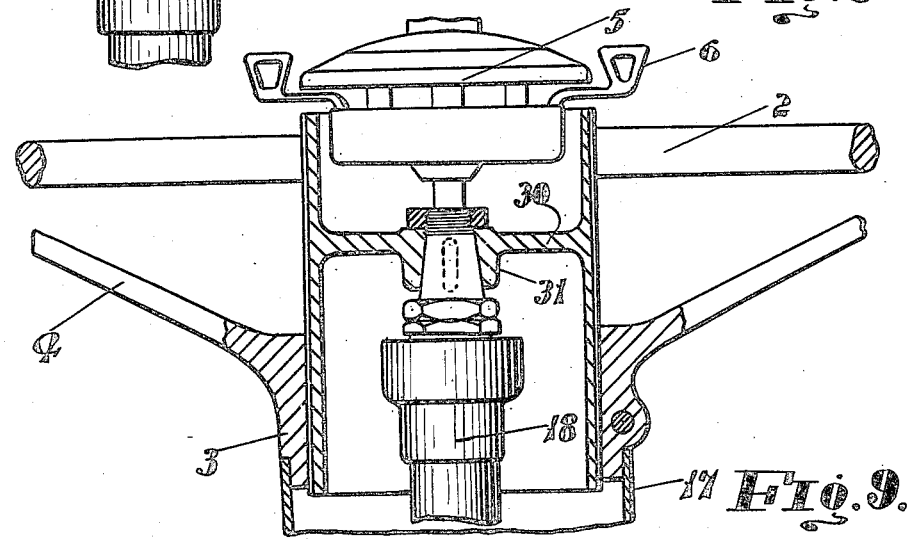
Inventor:- John George Douglas.
PER:- George Hughes
Attorney.

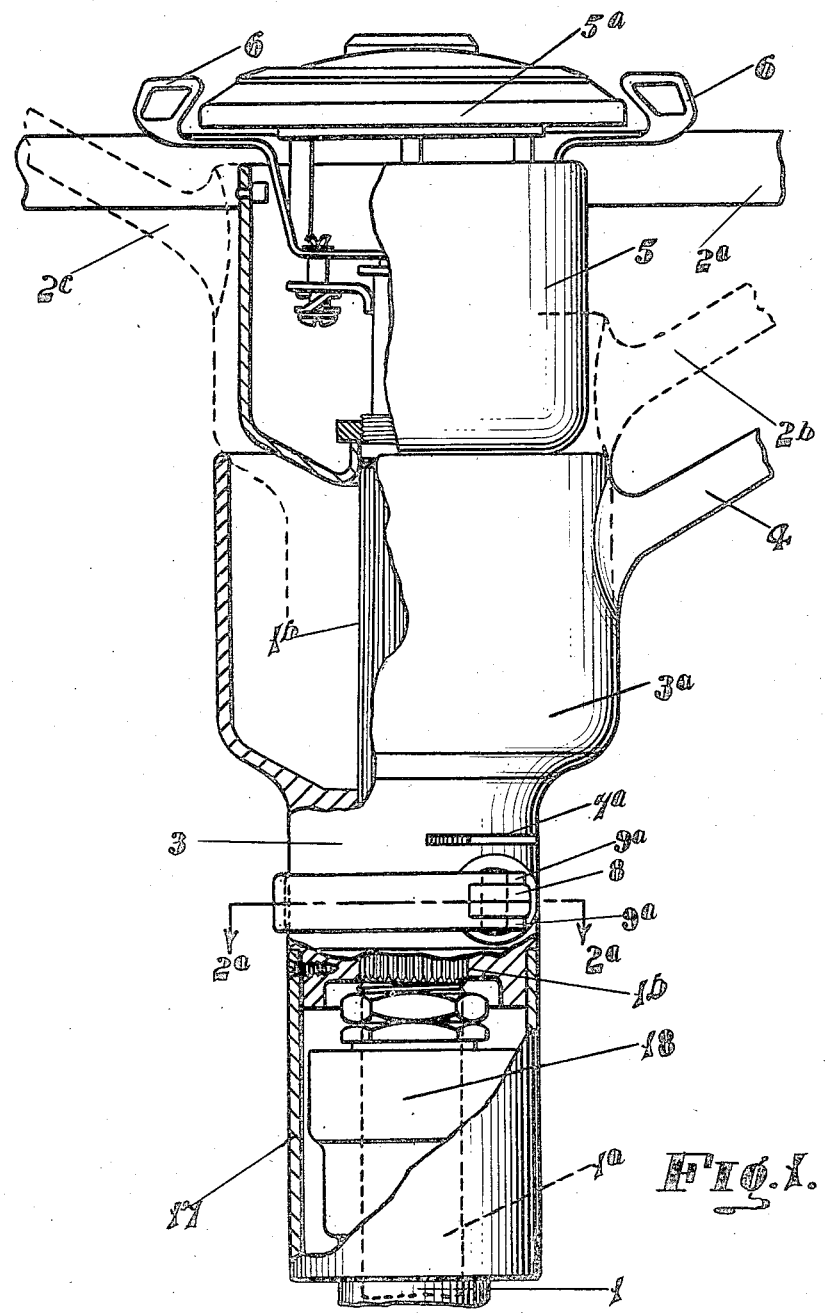

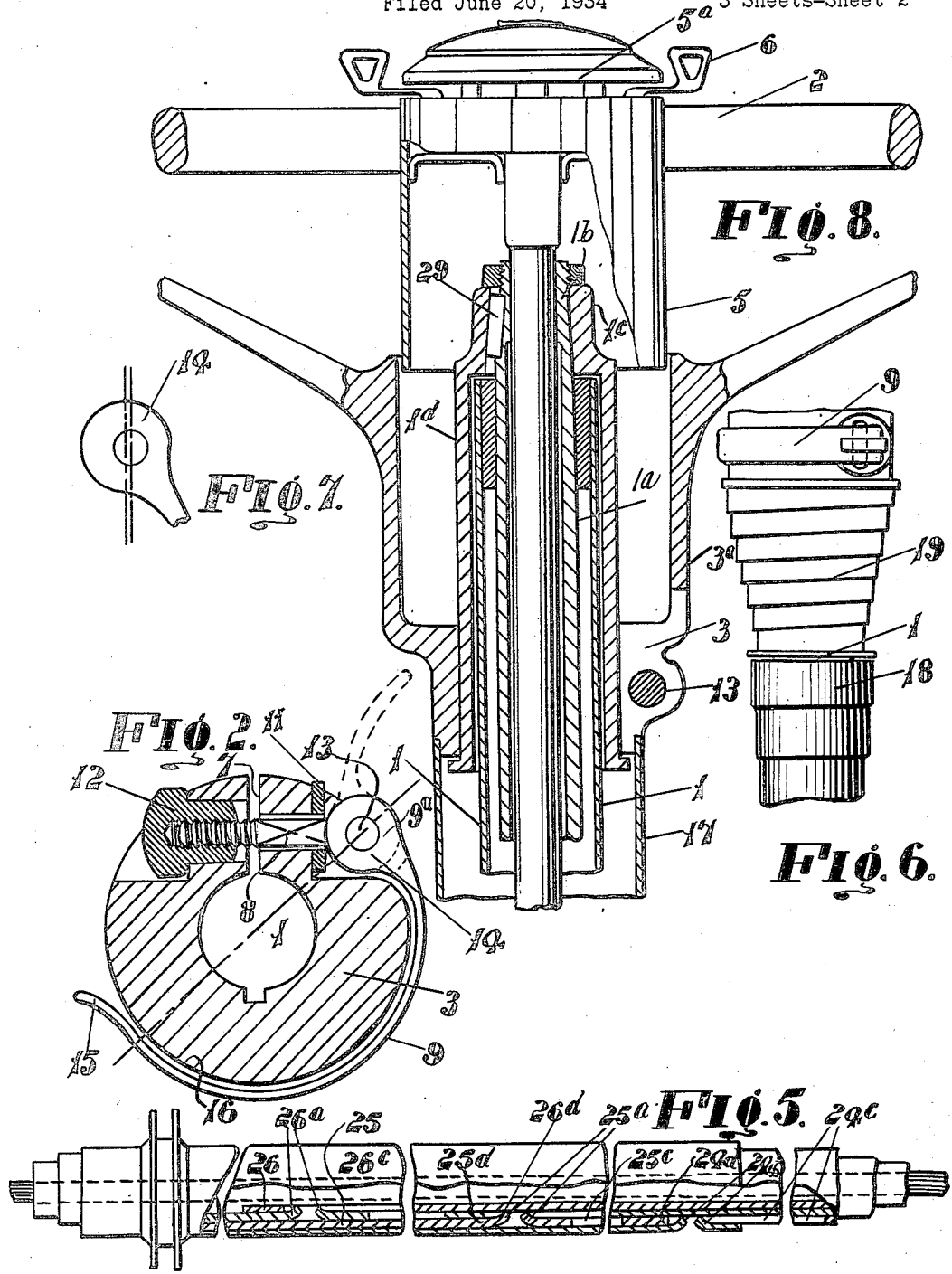

Patented Dec. 10, 1935

2,023,670

UNITED STATES PATENT OFFICE 2,023,670

STEERING GEAR OF MOTOR ROAD VEHICLES

John George Douglas, Leagrave, Luton, England

Application June 20, 1934, Serial No. 731,457
In Great Britain October 17, 1933

11 Claims. (Cl. 74—493)

REISSUED

My present invention relates to steering gear of motor road vehicles. The present practice with motor road vehicles is to provide an adjustable driver's seat so that the most comfortable position relative to the clutch, brake or other control pedals can be obtained by drivers of varying leg lengths, but if the steering wheel rim remains fixed and cannot be adjusted equally with the seat the position of said rim relative to the driver will obviously be incorrect. For example if the seat be adjusted forwards for a short driver, the steering wheel rim will be too close to his body and may even almost touch his chin or chest, and conversely, a tall driver will have to reach forward to the steering wheel, the result being inadequate control of the car and discomfort to the driver. To compensate for this disadvantage it has heretofore been proposed to provide an adjustable steering column of a telescopic nature. One of these consists in providing a steering wheel with a centrally depending sleeve which slides over a steering column and has a keyway connection therewith to prevent relative rotation, the sleeve being connected to the column by a pin passed through a hole in the end engaged selectively in a plurality of holes in the steering column. Such an arrangement is obviously unsuitable for modern requirements where neatness and cleanliness are the deciding factors, because oil and grease could leak between the telescopic parts and soil the dress of the driver, and also no motor road vehicle, particularly a private vehicle, is in accordance with present practice provided with a steering column in which the rotatable column itself is exposed above the floor board. In another heretofore proposed telescopic type of steering gear the wheel carries a depending sleeve which extends from the wheel to the part of the vehicle through which the column extends to the necessary steering mechanism. In this heretofore proposed device the rotatable steering column is accommodated in a fixed sleeve and extends beyond the top thereof and is fitted with a head to which is clamped the outermost sleeve carried by the steering wheel, the clamping being effected by threading a pin into the said head, such pin passing through a longitudinal slot in the outermost sleeve. Quite obviously such a device also has the objection that grease and oil could escape between the outermost sleeve and the fixed sleeve, and the method of clamping in both of these heretofore proposed devices provides excessive backlash under the alternating stresses when steering a car for both rotational and longitudinal movements, and the action of the first proposed device is not a clamping action, and in the second proposed device merely the axial pressure of the head of the screw is relied upon which is not adequate for clamping purposes bearing in mind the stresses and strains set up in a steering column, and also the peculiarities of some drivers some of which apply axial pressure to the steering wheel and some a pulling action.

My present invention is primarily concerned with the provision of an adjustable steering wheel which meets the requirements of modern practice inasmuch as it must be neat and free from risk of oil and grease leaking through the adjustable parts and also a firm and readily applied clamping means must be embodied combined with a fixed stator tube or outer column and neat and adjustable parts which enable the controls inside the column to be kept entirely inside a column of normal dimensions. The chief object of this invention is to provide a steering column in which a fixed outer column is employed and a steering column is accommodated inside the fixed outer column, and the means of adjustment are carried by an extension of the rotatable column above the stator or fixed column, the arrangement consisting in the steering column being formed with an extension beyond the top of the fixed outer column, and the steering wheel being adjustable along the said extension and being provided with means for readily locking it selectively to different parts of the said extension.

One form of my invention briefly consists in extending the rotatable upper end of the inner column to which the steering wheel is attached, beyond the usual fixed outer column, to an extent appreciably greater than that required to receive the central boss of the steering wheel; both the bore of the steering boss and such above mentioned extension of inner column are provided with any suitable means such as feathers or splines so that while said steering wheel can slide axially no relative rotational movement can occur between steering wheel and inner column; any suitable means such as sawcut and pinch bolt in steering wheel boss, clamp bolt in steering wheel boss similar to those sometimes used for securing tool shanks in turret lathes, set bolt with eccentric plain stem, or the like, is provided so that the steering wheel can be firmly fixed either by spanner or hand operation at any selected position within the range of such extension of inner column as may be required by the driver. The means adopted to fix such selected position as above mentioned may be of a semi-permanent nature requiring the use of a spanner or the like, or some suitable form of quick-acting clamp such as a wing pinch bolt or the eccentric bolt above mentioned or the cam lock herein below described may be used so that immediate adjustment can be effected without the use of tools or spanners.

In order that my invention may be clearly understood and readily carried into effect, I append hereto a sheet of drawings wherein:—

Fig. 1 is a part sectional side view of the steering wheel, and column in a preferred form of my invention.

Fig. 2 is a sectional plan view taken on the line 2a—2a of Fig. 1 but showing a key way in the steering wheel boss instead of a serrated or splined shaft.

Fig. 3 is a part sectional side view of the steering wheel and column similar to Fig. 1 incorporating a modification thereof.

Fig. 4 is a similar view to Fig. 3 only showing a further embodiment of my invention.

Fig. 5 is a part sectional view of the steering inner control tubes as adapted to the arrangement shown in Fig. 4.

Fig. 6 is a view showing an alternative arrangement of the wheel and central boss.

Fig. 7 is a view showing more clearly the cam employed in Fig. 2.

Figs. 8 and 9 show two further embodiments of the invention.

Referring to the accompanying drawings, I provide an outer fixed column 1 and above this I extend the top portion of the inner column 1a a number of inches as denoted at 1b according to what extent of adjustment is required, for example, six inches, such extension being obtained by merely lengthening the usual spline or in the case where a key way and key is employed by extending these parts. The steering wheel 2 comprises a central boss 3, see note on drawing, shorter than such inner column extension 1b, for example two inches long, with any suitable number of arms 4 radiating therefrom to the usual outer rim. The upper part of said boss 3 is in the form of a cup or pan 3a, in this case 3" deep to receive the control head casing 5, which in this case is also 3" deep (or long), and is fast to and rotates with the extended portion 1b of the inner column 1a. The thumb levers 6 for operating the headlights, ignition, throttle or other desired control tube or control tubes that pass down the inner column 1 and its extension 1a are suitably attached to such inner control tubes and the stator tube 24 and do not rotate with the inner column extension 1b, the control head casing 5 being usually mounted at top end of inner column 1, so that when steering wheel 2 is adjusted to its uppermost position such control head casing 5 fits nicely in the cup or pan 3a of the boss 3 but does not touch it. In order that such thumb levers 6 shall not project unduly above the plane of the steering wheel rim 2 when the steering wheel is adjusted to its lowest position as for example for a very short driver, I do not make the said steering wheel 4 at right angles to axis of column but inclined to such axis so that even with steering wheel in its lowest position the said thumb levers 6 and control head 5a shall be flush with or only project from plane of steering wheel rim by a predetermined suitable distance so as to avoid the possibility of interference with the driver's arms or coat sleeves when operating the steering wheel. The steering wheel in its lowest position is denoted by the reference numeral 3a and the midposition and uppermost position by the reference numerals 2b and 2c respectively. When the steering wheel is in its uppermost position, as shown at 2c, as for example for a very tall driver, the said thumb levers 6 and control head 5a lie appreciably below the plane of the steering wheel rim, but their relation to the said cup or pan 3a in the upper part of said steering wheel boss 3 and to the inclined arms or spokes of steering wheel is so arranged that the said thumb levers are accessible to the driver.

I provide a bore in the steering wheel boss 3 which is a nice sliding fit on the upper extension 1a of inner column 1 either with a serrated surface or as shown in Fig. 2 with a keyway to suit the key or feather on such extension 1a, and I partially split the lower portion of such boss 3 longitudinally and circumferentially as shown at 7 (see Fig. 2) and 7a (see Figs. 1 and 3) by means of a circular cutter, and fit a pinch bolt 8 at right-angles to axis of said bore so that boss 3 can be firmly clamped to said extension at any selected position between the uppermost and lowest points provided. The method of clamping the said boss 3 can comprise a lever 9 having one end 9a forked, said forked portion receiving the drawbolt eye, and being held in position by a pin 13, the said forked portion being in the form of a cam 14 and adapted when the lever is in the position shown in Fig. 2 to bear against a washer 11 and to take up any degree of slackness existing between the boss 3 and the column 1a. In practice the tension caused by operation of the lever 9 and cam 14 is regulated by means of a nut 12 screwed on to one end of the drawbolt 8. Hand operation of lever 9 to position shown dotted (Fig. 2) releases such tension and permits the boss 3 to be slid axially along the column 1a, and returning lever 9 to its closed position restores the tension and exercises a gripping action on the boss to maintain it in any selected position. Fig. 7 shows more clearly the cam 14 formed eccentrically about the pin 13. It will be seen that the curve of the lever 9 extends past a diameter of the wheel hub 3, measured from the centre of cam pin 13, so that when closing the cam 14, the point denoted by the reference numeral 15 on the lever 9 has to spring slightly over the contact point on hub 16; this ensures the lever 9 remaining snugly against the hub 3. The cam periphery and the washer 11 are of course hardened. I also provide a sleeve or extension 17 of said boss 3 of steering wheel, extending downwards and of such lengths as to cover the ballrace or other mechanism 18 situated usually at the top end of the fixed outer column 1 before referred to, the bore of said sleeve 17 being clearance fit over such ballrace or other mechanism 18 so that the steering wheel 2 and sleeve 17 can rotate freely, and the length of said sleeve 17 being such as to cover such ballrace 18 or the like even when the steering wheel is adjusted to its uppermost position as shown at 3c; I do this so that a neat and solid appearance shall always be apparent whatever the selected position may be of the steering wheel, and so that the detrimental appearance of a portion of the inner column extension between steering wheel boss and top end of outer column shall be avoided when the steering wheel is adjusted elsewhere than in the lowest position shown at 2a. The said sleeve 17 may be integral with the boss 3 of the steering wheel or may be a separate portion suitably attached thereto, for example as shown in Fig. 6, the said sleeve 17 can be replaced by an extensible volute type shroud 19 fixed at one end to the boss and at its other end to the column 1a, thereby obtaining a telescopic form of shroud.

Referring to embodiment disclosed in Fig. 3, in order to conceal the spline, or upper serrated or keywayed extension of the column 1a, and minimize the apparent length of wheel hub 3, especially when in the lower positions 2a and 2b, there is in addition to the boss 3 and control casing 5, a supplementary tubular shroud 20; which can slide axially on the extension 1a, its movement being limited by the travel of a pin 21 engaging in a keyway 22 formed in the extension 1a of the inner column; a spring 23 normally retaining the shroud in its lowest position, where it covers the gap between the control casing 5 and the boss or cup 3 when the wheel is in its lowest position. Raising the wheel first causes the shroud 20 to enter the boss 3, so that in middle position the shroud 20 is entirely located within the boss 3; further raising carries the shroud 20 with the boss 3 over the control casing 5, compressing the spring 23, so that in the top position of wheel only the boss or outside cup can be seen, both control casing 5 and shroud 20 being telescoped inside the boss 3.

Referring to Figs. 4 and 5, the control head 5a rises and falls with the wheel and a dished wheel is not therefore necessary. In this arrangement the stator tube 24 inside the rotary column 1a is held against rotation and end movement at the bottom of box, but as it is necessary for it to slide axially with the wheel 2, a sliding key 24b is provided in the upper end of this tube to engage in a keyway 24c formed in a reduced diameter part 24d of said stator tube so that whilst rotation cannot occur in either of the parts 24 or 24d the part 24 which is fixedly held in a circumferentially grooved ferrule 27 in which rotates a collar 28 attached to the wheel 2 can move axially relative to the part 24d which is stationary. The control tubes 25 and 26 are similarly formed with keys 25a and 26a respectively sliding in keyways 25b and 26b formed in reduced diameter portions 25d and 26d. The thumb levers 6 are attached to upper parts of the control tubes and are therefore caused to rise and fall with the wheel 2 and control head 5a, the lower reduced diameter parts 25a and 26a protruding through the usual box are prevented from end movement in any convenient way, as, for example, by the operating levers on them bearing on one side against the box bottom end-plate, and on the other against the face of switch box attached to the aforementioned box but at some distance from its bottom end-plate. In the event of the control thumb levers being mounted elsewhere than on the control head 5a, or only such controls as require wiring through the column such as a horn and/or lamp switch, such controls can be accommodated in or on and attached to the boss of the wheel, and can rotate with the wheel 2 and in this respect control tubes and the stator tubes 24 such as are described with reference to Figs. 4 and 5 are not required. Referring to Fig. 8 the inner column 1a is extended as shown at 1b and has affixed to its upper end 1c by a taper and key 29 a depending sleeve like member 1d which extends down over the usual fixed outer column or tube 1, the said sleevelike member 1d being formed with splines or feathers upon which slidably fits the boss 3.

Fig. 9 shows an arrangement in which the control head casing 5 is connected to the top of the extension 1b of the inner column 1a by means of a flange 30 radiating from the median portion and terminating in a boss 31 affixed to the upper end of such extension 1b, the boss 3 in this arrangement slidably fitting about splines or feathers on the outer surface of the control head casing 5.

What I claim is:—

1. In steering mechanism for motor road vehicles, an outer stator tube, a steering column rotatable in and extending above said stator tube, a steering wheel, a central boss carried by said steering wheel adjustable axially with the wheel relatively to the steering column, a clamp for selectively clamping said boss to a plurality of different points of said steering column above said stator tube, upper and lower tubular parts on said boss adapted to obscure the mechanism of the usual controlling means in the upper end of the steering column, and also the part of the steering column above said stator tube.

2. In steering mechanism for motor road vehicles a stator tube, a steering column rotatable and extending above the stator tube, a steering wheel, a central boss carried by with said steering wheel adjustable with the wheel axially relatively to the steering column, a control head in the centre of the steering wheel carried above said column, a device for readily clamping the said boss to different parts of the steering column above the stator tube, and a housing interposed between said boss and the control head of the steering column and adapted when the said wheel is lowered to surround the part of the steering column extending above the centre of the steering wheel.

3. In steering mechanism for motor road vehicles a steering column, a steering wheel, a central boss carried by said steering wheel adjustable axially with the wheel relatively to the steering column and a tubular extension on said boss enclosing the upper part of the steering column for the various positions of adjustment of said boss, a fixed outer stator tube above which the steering column extends to provide a part in prolongation of the stator tube along which the said boss is adjustable axially, co-operating opposed serrated surfaces on said boss and the prolonged part of the steering column, and means for selectively clamping said boss to different parts of said prolonged part of the steeling column.

4. In steering mechanism for motor road vehicles a stator tube, a rotatable steering column in said tube and extending above it, a steering wheel, a central boss carried by said steering wheel adjustable axially with the wheel relatively to the part of the steering column extending above said tube, a device for readily fixedly securing said boss to different parts of said rotatable steering column, a control head carried above said column, a housing interposed between said boss and the control head adapted when the said wheel is lowered to surround the part of the steering column extending above the boss of the steering wheel, and spring means with said housing to move the housing to said surrounding position when the wheel is lowered.

5. In steering mechanism for motor road vehicles an outer stator tube, a steering column therein, a steering wheel, a central boss carried by said steering wheel adjustable axially with the wheel relatively to the steering column, a tubular extension on said boss enclosing the upper part of the steering column for various positions of adjustment of said boss, said boss being split, and means with said split boss to contract it upon the steering column to selectively clamp the boss to different parts of the steering column.

6. In steering mechanism for motor road vehicles a steering column, a steering wheel, a fixed outer column, said steering column being extended above said outer column, a central boss carried by said steering wheel adjustable axially with the wheel relatively to said upwardly extended part of the steering column, and a tubular extension on said boss enclosing the said upwardly extended part of the steering column for various positions of adjustment of said boss, said boss being split, a bolt passed through the split part of the boss, serrations on said boss, and on said extended part of the steering column, a lever pivoted to one end of said bolt, and a cam on said lever adapted to press the opposed faces of the split part of the boss towards each other, so as to grip the serrations of the boss upon the serrations of the steering column.

7. In steering mechanism for motor road vehicles an outer stator tube, a steering column rotatable in said stator tube, a steering wheel, a central boss carried by said steering wheel adjustable axially with the wheel relatively to the steering column, said boss being split, a bolt like member passed through the split part to selectively clamp the boss fast to the steering column at a plurality of positions, an arcuately shaped lever partly disposed circumferentially about the boss carried by one end of said bolt like member and adapted to be hand-operated, a cam at one end of said lever, and an abutment formed in the periphery of the hub or boss against which said cam bears, said cam end being pivoted to an end of said bolt like member projecting beyond said abutment, a nut in the other end of the threaded member abutting against part of said boss on the opposite side of the split containing said abutment.

8. In steering mechanism for motor road vehicles a stator tube, a steering column rotatable therein, a steering wheel, a central boss carried by said steering wheel adjustable axially with the wheel along and relatively to the upper part of the steering column, means for selectively clamping said boss to different parts of said steering column, and a telescopic tubular extension on said boss enclosing the upper part of the steering column for various positions of adjustment of said boss.

9. In steering mechanism for motor road vehicles a stator tube, a steering column rotatable therein, a steering wheel, a central boss carried by said steering wheel adjustable axially with the wheel along and relatively to the upper part of the steering column, means for selectively clamping said boss to different parts of said steering column, and a telescopic tubular extension on said boss enclosing the upper part of the steering column for various positions of adjustment of said boss, said extension comprising a volute spring.

10. In steering mechanism for motor road vehicles a steering column, a fixed outer column, a steering wheel adjustable axially along and relatively to the steering column and means for selectively locking the steering wheel to different parts of the steering column for its various positions of adjustment, and a telescopic control tube in the column adapted to alter its effective length in conjunction with the axial adjustment of the wheel.

11. In steering mechanism for motor road vehicles a steering column, a steering wheel, a central boss carried by said steering wheel adjustable axially with the wheel relatively to the steering column, means to clamp the said boss selectively to different parts of the steering column, and a number of telescopic control tubes in the steering column adapted to alter their effective length in conjunction with the axial adjustment of the steering wheel.

JOHN GEORGE DOUGLAS.